(12) United States Patent
Stoupin et al.

(10) Patent No.: US 9,529,098 B2
(45) Date of Patent: Dec. 27, 2016

(54) X-RAY MONITORING OPTICAL ELEMENTS

(71) Applicant: UCHICAGO ARGONNE, LLC, Chicago, IL (US)

(72) Inventors: Stanislav Stoupin, Willowbrook, IL (US); Yury Shvydko, Lisle, IL (US); John Katsoudas, Chicago, IL (US); Vladimir D. Blank, Moscow (RU); Sergey A. Terentyev, Moscow (RU)

(73) Assignee: UChicago Argonne, LLC, Chicago, IL (US)

( * ) Notice: Subject to any disclaimer, the term of this patent is extended or adjusted under 35 U.S.C. 154(b) by 112 days.

(21) Appl. No.: 14/041,831

(22) Filed: Sep. 30, 2013

(65) Prior Publication Data
US 2015/0092925 A1   Apr. 2, 2015

(51) Int. Cl.
*G01T 1/26* (2006.01)
*C23C 16/27* (2006.01)

(52) U.S. Cl.
CPC ......................................... *G01T 1/26* (2013.01)

(58) Field of Classification Search
CPC .................................. C23C 16/27; G01T 1/26
See application file for complete search history.

(56) References Cited

U.S. PATENT DOCUMENTS

| | | | |
|---|---|---|---|
| 5,079,425 A | 1/1992 | Imai et al. | |
| 5,404,014 A | 4/1995 | Shu et al. | |
| 5,773,830 A | 6/1998 | Lu et al. | |
| 6,037,595 A * | 3/2000 | Lingren | 250/370.01 |
| 6,072,181 A * | 6/2000 | Hassard et al. | 250/370.01 |
| 6,137,107 A * | 10/2000 | Hanson et al. | 250/332 |
| 6,707,045 B1 * | 3/2004 | Sussmann et al. | 250/370.01 |
| 7,368,723 B2 | 5/2008 | Whitehead et al. | |
| 8,242,455 B2 | 8/2012 | Whitehead et al. | |
| 2003/0107003 A1* | 6/2003 | Whitehead | 250/370.12 |
| 2005/0014653 A1* | 1/2005 | Reeves | C30B 29/22 505/100 |
| 2008/0061235 A1* | 3/2008 | Guerrero et al. | 250/336.1 |
| 2008/0099869 A1* | 5/2008 | Izumi | 257/443 |
| 2010/0098970 A1* | 4/2010 | Galbiati | 428/670 |
| 2010/0155615 A1* | 6/2010 | Whitehead et al. | 250/370.14 |
| 2012/0091354 A1* | 4/2012 | Gerts et al. | 250/371 |
| 2012/0293192 A1* | 11/2012 | Lapington | 324/691 |

OTHER PUBLICATIONS

Afanas'ev, et al., Diffraction of X-rays and Electrophysical Properties of Crystals, American Institute of Physics, Sep. 20, 1978, pp. 321-324, vol. 28, No. 6, JETP Lett.

(Continued)

*Primary Examiner* — Nicole Ippolito
*Assistant Examiner* — Sean Luck
(74) *Attorney, Agent, or Firm* — Foley & Lardner LLP

(57) ABSTRACT

An X-ray article and method for analyzing hard X-rays which have interacted with a test system. The X-ray article is operative to diffract or otherwise process X-rays from an input X-ray beam which have interacted with the test system and at the same time provide an electrical circuit adapted to collect photoelectrons emitted from an X-ray optical element of the X-ray article to analyze features of the test system.

13 Claims, 12 Drawing Sheets

(56) References Cited

OTHER PUBLICATIONS

Als-Nielsen, et al., Elements of Modern X-ray Physics, Second Edition, Chapter 3.4, Snell's law and the Fresnel equations in the X-ray region, 2011, pp. 70-78, John Wiley & Sons, Ltd., West Sussex, UK.

Ebel, Quantitative Analysis by X-Ray Induced total Electron Yield (TEY) Compared to XRFA, International Centre for Diffraction Data, 2004, pp. 146-155, vol. 47, Advances in X-ray Analysis.

Henke, et al., The Characterization of Xray Photocathodes in the 0.1-10keV Photon Energy Region, J. Appl. Phys., Mar. 1981, pp. 1509-1520, vol. 52, American Institute of Physics.

Kikuta, et al., Double-Crystal, Vacuum X-ray Diffractometer, Rev. Sci. Instrum, Dec. 1977, vol. 48, No. 12, American Institute of Physics.

Kikuta, et al., Variation of the Yield of Electron Emission from Single Crystals with the Diffraction Condition of Exciting X-Rays, Japanese Journal of Applied Physics, 1978, vol. 17, Supplement 17-2, pp. 271-274, Proceedings from the International Conference on X-Ray and XUV Spectroscopy, Sendai, 1978.

Kitamura, et al., Synchrotronradiationexcited Etching and Total Electron Yield Measurement of Silicon and Silicon Nitride, J. Vac. Sci. Technol. A, 1995, vol. 13, pp. 2451-2455, American Vacuum Society.

Kummer, et al., Thin Conductive Diamond Films as Beam Intensity Monitors for Soft X-Ray Beamlines, Rev. Sci. Instrum., 2013, vol. 84, pp. 035105-1-035105-6, American Institute of Physics.

Polyakov, et al., Characterization of Top-Quality type IIa Synthetic Diamonds for New X-Ray Optics, Diamond and Related Materials, 2011, vol. 20, pp. 726-728, Elsevier B.V.

Powell, et al., Evaluation of calculated and Measured Electron Inelastic Means Free Paths Near Solid Surfaces, J. Phys. Chem. Ref. Data., 1999, vol. 28, No. 1, pp. 19-62, American Institute of Physics and American Chemical Society.

Shchemelev, et al., External Photoelectric Effect and High-Efficiency Photocathodes in the Soft-X-Ray Region of the Spectrum, Phys. Solid State, Sep. 1997, vol. 39, No. 9, pp. 1487-1492, American Institute of Physics.

Shih, et al., Secondary Electron Emission from Diamond Surfaces, J. Appl. Phys., Aug. 15, 1997, vol. 82, No. 4, pp. 1860-1867, American Institute of Physics.

Stohr, NEXAFS Spectroscopy, Chapter 5.2, Electron Yield Detection, 1992, pp. 118-133, Springer Series in Surface Sciences, vol. 25.

Stoupin, et al., Diamond Crystal Optics for Self-Seeding of Hard X-Rays in X-Ray Free-Electron Lasers, Diamond & Related Materials, 2013, vol. 33, pp. 1-4, Elsevier B.V.

Thompson, et al., X-Ray Data Booklet, Oct. 2009, pp. 1-176, Center for X-Ray Optics and Advanced Light Source, Lawrence Berkeley National Laboratory, University of California, Berkeley, California, USA.

Vlachos, et al., Specimen Charging in X-Ray Absorption Spectroscopy: Correction of Total Electron Yield Data from Stabilized Zirconia in the Energy Range 250-915 eV, J. Synchrotron Rad., 2005, vol. 12, pp. 224-233, International Union of Crystallography, Great Britain.

\* cited by examiner

X-RAY MONITORING OPTICAL ELEMENTS

STATEMENT OF GOVERNMENT INTEREST

The U.S. Government has rights in this invention pursuant to Contract No. W-31-109-ENG-38 between the U.S. Government and the University of Chicago and/or pursuant to DE-AC-02-06 CH11357 between the U.S. Government and the UChicago Argonne, LLC representing Argonne National Laboratory.

FIELD OF THE INVENTION

This invention relates to development of a method, system and article of manufacture for X-ray monitoring by selected optical elements. More particularly the invention relates to a method, system and article of manufacture which can sense hard X-rays to generate an electrical current characteristic of the intensity of the X-ray beam and at the same time act as a diffracting element for X-ray optical systems. This methodology and system can also function in a similar manner for many classes of X-ray optics, including but not limited to reflective or mirror systems, refracting lenses and for transmission optics, such as filters, windows, apertures or pinholes.

BACKGROUND OF THE INVENTION

In hard X-ray optics monitoring an intensity of hard X-rays (photon energies ~5-50 keV) incident on an optical element typically requires a stand-alone X-ray detector placed upstream of the optical element. Such an X-ray detector can alter the incident X-ray beam by absorbing a fraction of incident radiation and/or disturbing the radiation wavefront. Furthermore, delicate detector electronics and operating conditions may not be always compatible with the harsh radiation environment of a synchrotron or XFEL beamline. In particular, it is problematic or in some cases impossible to monitor intensity of an intense X-ray beam incident on front-end beamline optics (e.g., primary X-ray windows, high heat load monochromators, X-ray mirrors and refractive lenses etc.). X-ray optical elements for hard X-rays are made of solid state materials such as Si, Ge, C (diamond), Be, $SiO_2$ (quartz, silica), $Al_2O_3$ (sapphire) as well as metallic films (Pt, Au, and Pd) deposited on various substrates. A device that performs functions of an X-ray optical element and an X-ray monitor simultaneously should be compared primarily with solid state X-ray detectors. Solid state detectors are based on semiconductors (primarily Si and Ge). Detection of X-rays or some other types of electromagnetic radiation (such as visible light) requires tailoring of bulk semiconductor properties such as forming p-n junctions. The radiation incident on the active region of a detector then produces electric carriers which results in a measurable voltage or electric current. Such modification of a solid state material is generally not compatible with the performance characteristics of the optical element. For example, early demonstrations of X-ray detection by voltage developed across an optical element included a p-n junction within the diffracting Si crystal (i.e., required doping of Si to tune its electric properties). However, the best material for diffracting X-ray crystal optics is a high-purity (i.e., undoped) Si due to better crystal quality.

In recent years considerable effort has been made towards development of diamond solid state X-ray detectors which led to commercially available products such as beam position monitors and solid state ion chambers. Diamond is a particularly important material for solid state X-ray detector applications in harsh radiation environments due to its low X-ray absorption, high thermal conductivity and high radiation hardness. On the other hand, diamond is an electrical insulator characterized by absence of free carriers and a far-from-ideal dielectric with deep level traps in the band gap. Electrons and holes generated by absorption of X-ray photons remain trapped inside the crystal unless a penetrating electric field is applied. Most efforts for developing diamond and other solid state detectors for X-rays has been directed towards optimization of charge collection from the bulk of the material. Solutions such as application of bias voltage and reduction of bulk impurity concentration (diamond fabrication using chemical vapor deposition method (CVD)) have been implemented to mitigate poor bulk charge collection in diamond.

State-of-the-art CVD diamond based detectors have useful characteristics. However, most such detectors are delicate stand alone devices with limitations on radiation environments and can also disturb the radiation wavefront by presence of defects in the crystal structure of CVD diamond. These defects can also limit applicability of CVD diamond as an X-ray optical element (e.g. diffracting crystal). Although some robust diamond radiation detectors have been patented recently that may be compatible with hostile radiation environments, none have been claimed to perform a function of an X-ray optical element at the same time, except the most trivial one—an X-ray window. Therefore, there remains a substantial need for a simple but highly effective hard X-ray detector for X-ray optical systems.

In the soft X-ray regime (photon energies below 5 keV) detection of X-rays is often performed using total electron yield due to photoemission. Photoemission is one of the basic outcomes of interaction of X-rays with matter where an absorbed X-ray photon creates multiple photoionization events while some of the generated electrons leave the exposed material. The material (usually conductive) is in direct contact with a conductive sample holder that is connected to the electrical ground through a current meter. As an uncompensated charge develops due to escape of photoelectrons a compensating electric current flows to the substrate and is registered by the current meter. The magnitude of this current serves as a measure of the incident or absorbed photon flux. A similar strategy can be applied to detection of hard X-rays by a variety of X-ray optical elements, which, however does not require bulk conductivity in the materials.

SUMMARY OF THE INVENTION

In the present method X-ray induced photoemission and X-ray induced enhancement in surface conductivity are utilized to form a hard X-ray monitor as opposed to bulk charge collection in a semiconductor device. An energy of a hard X-ray photon is sufficient to create multiple photoionization events where a number of photoelectrons completely escape the material from a small depth (100 Å) near the surface. As a result an uncompensated electric charge is generated. At the same time, charge carriers generated by X-rays that don't escape the material can substantially enhance its surface conductivity. An electrical contact between the material surface and an electron supply (e.g., electrical ground) will result in an electric current that compensates the generated surface charge. The magnitude of this current can serve as a measure of the incident photon flux.

In one example of a preferred embodiment, a diffracting diamond crystal of high crystal quality (state-of-the-art for diffracting crystal), was constructed to serve as an incident X-ray intensity monitor. The principle of operation of the monitor does not rely on the bulk properties of X-ray optical element. For a variety of materials no surface modification is required to form a useable X-ray monitoring device. Therefore, similar monitoring capability can be implemented for other types of X-ray optical elements such as mirrors, refractive and diffracting lenses, capillary optics and absorbing optics. These can also be made of materials other than diamond and Si.

These and other objects, advantages and features of the invention, together with the manner of operation and organization of methods and construction, will become apparent from the preceding and the following detailed description taken in conjunction with the accompanying drawings.

DETAILED DESCRIPTION OF PREFERRED EMBODIMENTS

Figures 1A, 1B:
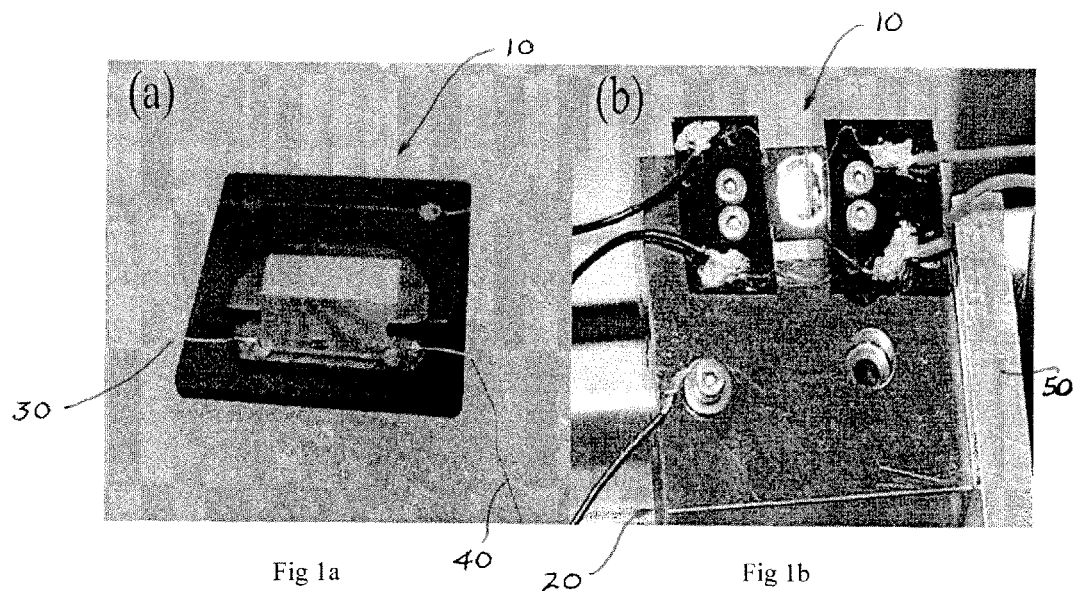
FIG. 1(a) shows one embodiment of an X-ray monitoring diffracting diamond assembly: high quality diffracting diamond crystal (type IIa, (111) surface orientation) is mounted on a CVD diamond substrate, a platinum electrode is deposited on the diamond and another similar electrode is deposited on the substrate.
FIG. 1(b) shows wired assembly exposed to white beam synchrotron radiation.

An illustration of a prototype X-ray monitoring optical element 10 is shown in FIGS. 1(a) and (b). The optical element 10 is a diffracting diamond crystal of type IIa produced using high temperature and high pressure synthesis method, having state-of-the-art crystal quality and (111) surface orientation. This optical element 10 can be used justly as a diffracting crystal in X-ray optical systems. The optical element 10 is mounted on a substrate 20 fabricated using a conventional chemical vapor deposition method ("CVD"). A platinum electrode 30 was deposited directly on the diamond surface and an additional reference platinum electrode 40 was deposited on the substrate 20 as shown in FIG. 1(a). FIG. 1(b) shows the mounted diamond crystal exposed to white beam synchrotron radiation (one example of hard X-rays) at a bending magnet beamline of the Argonne National Laboratory Advanced Photon Source (APS). Note that the diamond region exposed to intense X-rays generates luminescence in the visible range (blue) thereby secondly enabling use also as a sensing device.

Figure 3A:
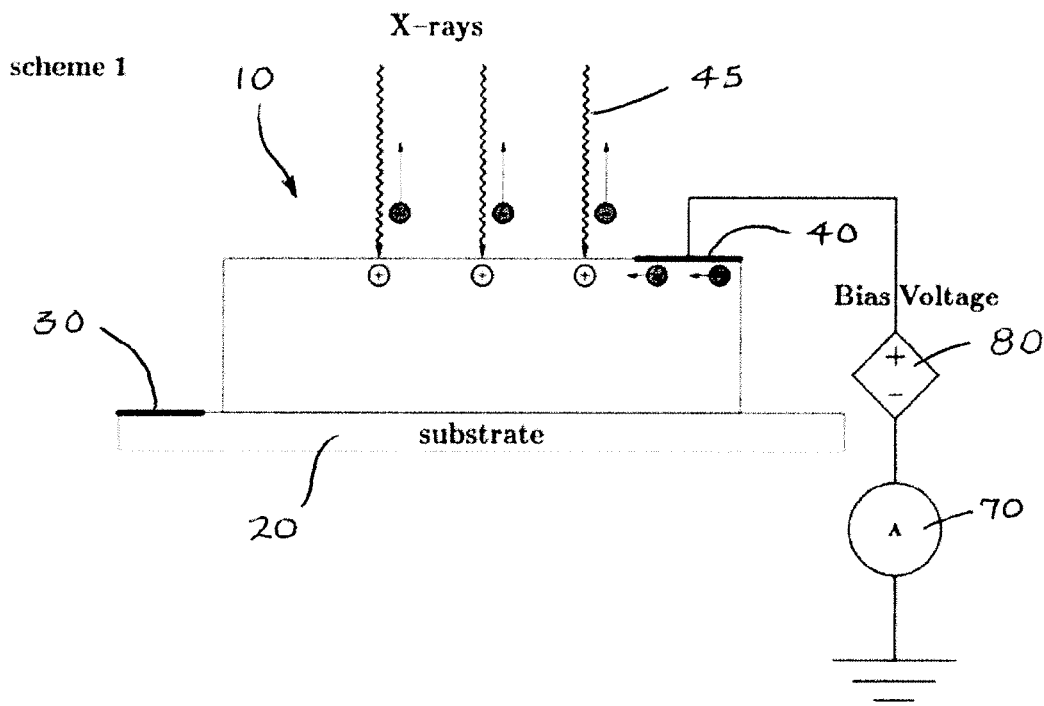
FIGS. 3(a)-3(c) show schemes 1-3 of various preferred electrical circuit embodiments.
Figure 3B:
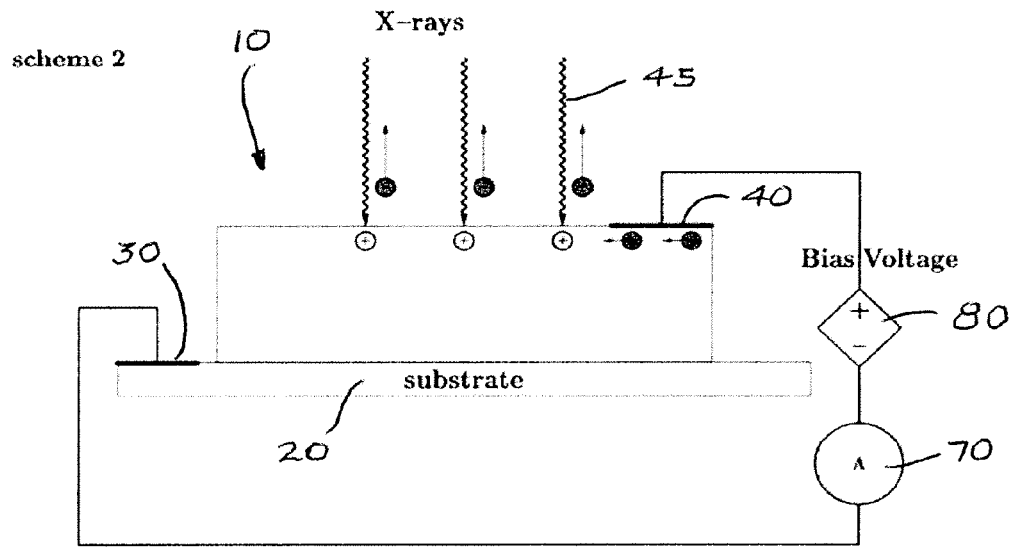
Figure 3C:
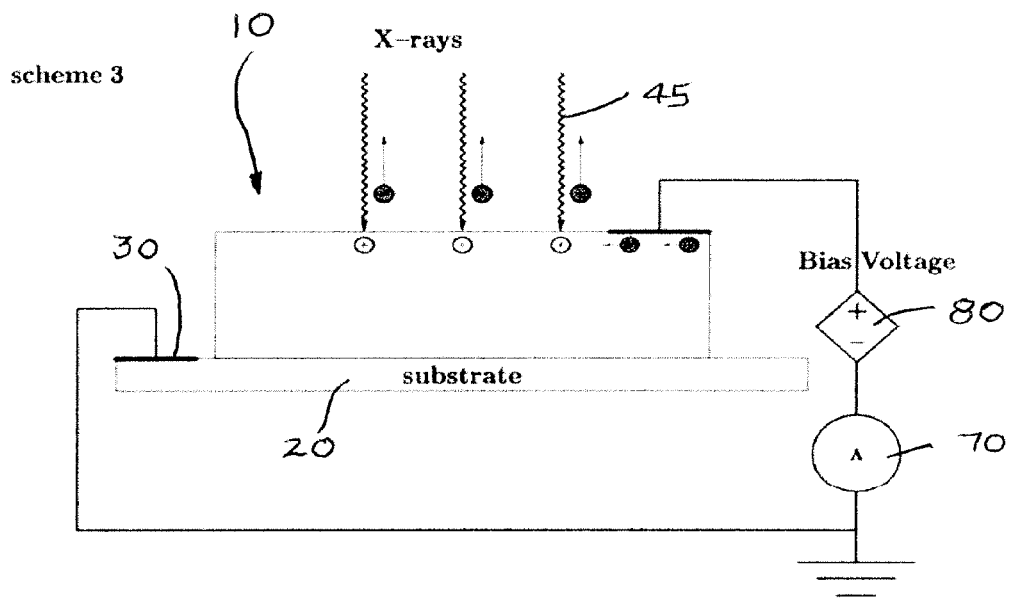

In a preferred embodiment shown in FIGS. 3(a)-3(c) an X-ray monitoring capability for the optical element 10 uses the following configuration for detection of total electron yield. An electrode 30 is directly applied to a portion of the X-ray entrance surface of the optical element 10. This portion is not directly exposed to the incident radiation. In such a system a substantial electric transport can occur due to surface conductivity of the working surface of the optical element 10. An enhancement in surface conductivity can be expected due to exposure to hard X-rays, since electric carriers are created by photoionization. Further improvement in surface conductivity and in detection of total electron yield can be achieved via optimization of surface properties of the optical element 10. In the case of a diffractive crystal this approach provides much flexibility since diffraction of hard X-rays occurs in the optical bulk of the element 10. In other cases such as refractive or reflective optics high interface quality (polished and/or treated surfaces with small roughness) often provides a convenient playground for studying and tuning surface properties.

An improvement can be also achieved by lowering the electric potential of the working surface using a voltage source (bias voltage source 80) in FIGS. 3(a)-3(c) and a presence of additional electrodes in the vicinity of the optical element 10 that can help in capturing electrons escaping from the working surface of the optical element 10 and/or provide an enhancement in the measured electric current due to an additional current in the bulk of the optical element 10. The substrate 20 may become conductive under exposure to an X-ray beam 45. Thus the optical element may also act as a capacitor. Note that the electrodes 30, 40 are not exposed to X-rays, which improves radiation hardness of the device and enables its applications in high heat load X-ray optics.

In an ideal case when electric compensation is instantaneous and complete, the electric current should be proportional to the number of incident X-ray photons per second (i.e., incident X-ray flux). The proportionality coefficient depends on several factors such as energy of X-ray photons, surface and bulk properties of the material. Without limiting the scope of the invention the utility of X-ray detection by total electron yield can be obtained via estimation of the proportionality factor. The magnitude of the effect has practical significance and thus enables many particular types of X-ray monitoring optical elements and a wide range of potential applications. This method will be detailed in the following non-limiting Examples which illustrate various aspects of analysis of the method and system.

Example I

A quantitative description of total electron yield is provided which follows a known basic phenomenological model [see, for example, J. Stohr, NEXAFS spectroscopy, vol. 25 of Springer Series in Surface Sciences (Springer, Berlin Heidelberg New York, 1992)]. The goal is to estimate electric current due to total electron yield in several primary X-ray optical materials for hard X-rays. This consideration will lead to several important practical estimates given in Example III.

At normal incidence X-ray photons penetrate into the bulk of the material to a characteristic depth $\zeta$ (X-ray absorption length) given by the inverse of the linear attenuation coefficient $\mu(E_X)$ [cm$^{-1}$], which is a function of photon energy $E_X$. The X-ray flux density f [photons/(s cm$^2$)] transmitted through a material depth z is attenuated (with respect to an incident flux $f_0$ according to the Beer's law $$f = f_0 \exp(-\mu(E_X)z). \quad (1)$$

The X-ray attenuation coefficient is related to the total X-ray attenuation cross section $\sigma(E_X)$ [cm$^2$/atom] by, $$\mu(E_X) = \rho_n \sigma(E_X), \quad (2)$$

where $\rho_n$ is the atomic volume density [atoms/cm$^3$].

The dominant contribution to attenuation of X-rays (in the practical range for X-ray optics $E_X \lesssim 50$ keV) is due to the photoelectric absorption cross section $\sigma^{pe}(E_X)$ which is a measure of probability of photoionization (i.e., creation of a photoelectron upon absorption of an X-ray photon). Thus, in our practical consideration $\mu(E_X) \simeq \rho_n \sigma^{pe}(E_X)$.

In general, substantial portion of X-rays incident on the optical element 10 can be reflected due to either total external reflection in grazing incidence from an X-ray mirror or due to Bragg diffraction (if both, incident radiation bandwidth and angular spread are smaller or comparable to the intrinsic energy and angular acceptances of Bragg reflection under consideration). The general concept of photoelectric absorption cross section still applies. Only the number of X-ray photons interacting with the material should be reduced by a factor 1−R, where R the X-ray reflectivity, which in general is a function of the incidence angle and photon energy $R = R(\theta, E_X)$.

Summarizing all the above, the number of photoelectrons created in the material at a depth z per second, within an increment dz, is given by $$n^e(z) = f_0 S_0 (1 - R(\theta)) \frac{\mu}{\sin\theta} \exp\left(-\frac{\mu z}{\sin\theta}\right) dz. \quad (3)$$

Here, $S_0$ is the surface area of the sample exposed to X-rays and $\theta$ is the glancing angle of incidence of X-rays to the surface. The explicit dependence on the photon energy $E_X$ was omitted for brevity.

A fraction of excited photoelectrons can completely escape the material. On the way to the surface these electrons exhibit inelastic scattering such as electron-electron, electron-plasmon and electron-phonon interactions. The inelastic scattering results in reduction of the energy of the primary photoelectrons. Electrons generated deep in the bulk of the material have insufficient energy to escape. Electrons can only escape the material if they are generated within a certain characteristic depth. This depth is known as a mean free path, which is a function of the electron energy. The electron mean free path is dominated by inelastic scattering events and is often referred to as electron inelastic mean free path (IMFP). For many elementary materials IMFP values have been calculated, experimentally verified and compiled into a database (a relatively small number of experimental studies have been performed at hard X-ray energies, above $\approx 5$ keV).

The initial energy of an excited photoelectron $E^e$ is the difference between the photon energy and the energy of electron binding state in an atom: $E^e = E_X - E_B$ (an excitation of a photoelectron from a particular binding state requires $E_X > E_B$).

In addition, Auger electrons of certain energies characteristic to an atom are created as a possible de-excitation route for the atom. For light elements with atomic number $Z \lesssim 30$ this is a dominant mechanism of relaxation. Auger electrons can also escape the material and thus are contributing to the total electron yield.

Figure 2A:
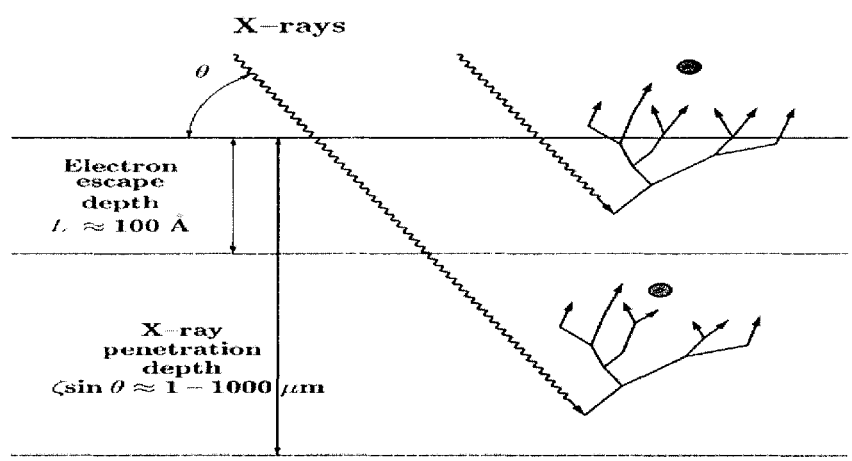
FIG. 2(a) shows photoabsorption and electron production at photon penetration depth (electrons do not escape the material) and within the effective electron escape depth L (electrons can escape the material)
Figure 2B:
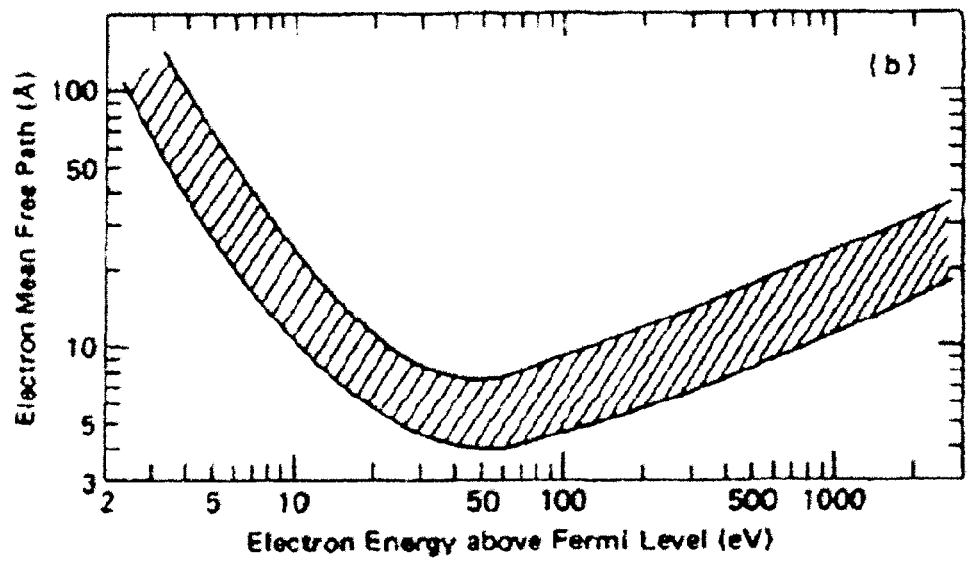
FIG. 2(b) shows electron mean free path in solids as function of the electron kinetic energy above the Fermi level, the shaded are represents distribution typically found for different materials. (Note: the figure is adopted from J. Stohr, NEXAFS spectroscopy, vol. 25 of Springer Series in Surface Sciences (Springer, Berlin Heidelberg New York, 1992)).

Rigorous calculation of total electron yield for an X-ray photon of an arbitrary energy is complicated by the following two main factors. First, accurate prediction of photoionization probabilities (cross sections) of various subshells within an atom is difficult due to complexity of the physics of different atomic orbitals. Second, the inelastic scattering does not only reduce the energy of the primary photoelectrons but also produces a cascade of secondary electrons with smaller energies as shown schematically in FIG. 2(a). The electron mean free path as a function of energy is shown in FIG. 2(b). The shaded area represents its variation for different materials. This is primarily focused on soft incident X-rays ($E_X \lesssim 2$ keV). At hard X-ray energies the inelastic mean free path monotonically increases and reaches values of $\approx 100$–150 Å at $E_X \approx 10$ keV for the primary X-ray optical materials. The escape length of low-energy secondary electrons is comparable to that of the primary photoelectrons (FIG. 2(b)). In most cases, the number of secondary electrons generated per incident photon is expected to be substantially greater than one (i.e., single photoelectron of energy $E^e$). Therefore, secondary electrons comprise a substantial portion of the total electron yield.

In the following formulation of the total electron yield, an assumption is made that the energy distribution of low-energy secondary electrons is independent on the primary electron energy once it is higher than about 20 eV and that the number of the secondary electrons is proportional to the incident photon energy $E_X$. The total electron gain (number of electrons generated per one photoionization event) is $G^e(E_X) = E_X M$, where M is a material constant describing the conversion efficiency. In analogy to the attenuation of X-rays described by Eq. (1) one can introduce a quantity $1/L$ as a linear electron-attenuation coefficient (where L is the effective energy-independent electron escape depth). This quantity mathematically describes the electron scattering process as the attenuation of a single primary photoelectron multiplied by gain factor $G^e(E_X)$. The primary photoelectron generated in the depth increment dz upon absorption of a phonon with energy $E_X$ contributes a fraction $dy(z, \Omega)$ to the total electron yield, emitted into a solid angle $\Omega$. This fraction is given by, $$dy(z, \Omega) = \frac{\Omega}{4\pi} G^e n^e(z) \exp(-z/L). \quad (4)$$

One should obtain total electron yield via integration of Eq. (4) over the sample thickness and the solid angle. It is illustrative to express the X-ray absorption coefficient through the X-ray absorption length $\zeta = 1/\mu$ and introduce an X-ray photon penetration depth $\zeta_\theta = \zeta \sin\theta$. For simplicity we assume that the material is semi-infinite or, equivalently, the thickness of the material $d \gg L$ and $d \gg \zeta_\theta$.

Integration over the solid angle yields the following expression, $$dY(z) = \frac{1}{2} f_0 S_0 (1 - R(\theta)) G^e \frac{1}{\zeta_\theta} \exp\left(-\frac{z}{\zeta_\theta}\right) \exp\left(-\frac{z}{L}\right) dz. \quad (5)$$

Integration of Eq. (5) over the sample thickness produces a general expression for total electron yield from an optical element.

$$Y = \frac{1}{2} f_0 S_0 (1 - R(\theta)) G^e \frac{L}{\zeta_\theta + L}. \quad (6)$$

Example II Quantum Yield

In this Example II particular practical cases are considered to obtain formulas for a quantum yield, which is a number of photoelectrons emitted per single incident X-ray photon of energy $E_X$:

$$Q = \frac{Y}{f_0 S_0} = \frac{1}{2}(1 - R(\theta)) G^e \frac{L}{\zeta_\theta + L}. \quad (7)$$

In grazing incidence under the condition of total external reflection (i.e., X-ray mirror case) a substantial increase in the quantum yield can be obtained. This condition is satisfied if $\theta < \theta_C$ where $\theta_C$ is the critical angle that depends on the choice of the material and incident photon energy (e.g.,). The estimate of total electron yield can be performed by replacing in Eq. (7) the X-ray penetration depth $\zeta_\theta$ with X-ray attenuation length $\Lambda$ in total external reflection. The values for $\Lambda$ can be obtained using an online calculator.

The penetration depth at angle of incidence below the critical angle can be several times smaller than the effective electron escape length. Therefore an assumption $\Lambda \ll L$ can be applied. Under this approximation the quantum yield does not depend on the photoelectric absorption in the reflective material:

$$Q \simeq \frac{1}{2}(1 - R(\theta)) G^e. \quad (8)$$

Although, only a small fraction of X-ray intensity $(1-R(\theta)) \simeq 10^{-2}$ can contribute to photoelectric absorption in total external reflection, the smallness of the penetration depth provides a dramatic enhancement. This is due to the fact that in total external reflection X-rays propagate nearly parallel to the surface of the material and interact mostly with electrons in atoms located close to the surface. The primary photoelectrons, Auger electrons and the secondary electrons produced near the surface have higher probability to escape the material which leads to enhancement of the quantum yield.

In absence of total external reflection the absorption depth is much larger than the effective electron escape depth $\zeta_\theta \gg L$. The quantum yield is given by, $$Q \simeq \frac{1}{2}(1 - R(\theta)) G^e \frac{L}{\zeta_\theta}. \quad (9)$$

Thus, it is reduced by the factor $L/\zeta_\theta$. Many cases that fall within this scenario do not exhibit substantial reflection (i.e., $(1-R(\theta)) \simeq 1$). These include refractive optics and high-heat-load diffracting optics where only a small fraction of incident photons is reflected into a narrow energy/angular region.

Example III

Table I herebelow presents a summary of quantum yield for various X-ray optical materials. For Au the effective photoelectron escape depth was assumed L=50 Å. For other materials in the list (a dielectric C and a semiconductor Si) L=100 Å was assumed. In case of Au the value for $G^e$ was available in the literature; and the quantum yield at a representative energy 10 keV was estimated directly from Eq. (7). For C and Si the values for electron yield relative to that of Au were given in the literature for particular energies. In these cases $G^e$ was calculated at those energies and extrapolated to a representative energy of 10 keV.

In the case of total external reflection (TER) for Au the quantum yield can be as high as 0.6 (Au) which is due to the fact that the X-ray photon penetration depth is only about 10 Å (much less than L=50 Å). The X-ray photon penetration depth was estimated at an angle of $\theta=2.5$ mrad, which is below the critical angle for total external reflection for many mirror materials and a typical operating value for hard X-ray mirrors.

In absence of total external reflection higher quantum yields can be obtained if more photons are absorbed within the effective photoelectron escape depth as follows from Eq. 9. To obtain a representative numbers in these cases normal incidence of X-rays was assumed, i.e. $\theta=\pi/2$.

X-ray photoabsorption in silicon is more than one order of magnitude greater than that of diamond which results in a substantial enhancement of quantum yield. However, another important parameter, the electron gain factor $G^e$ can be greater for diamond. For example, presence of hydrogen surface termination and/or boron doping is known to substantially increase secondary electron yield when primary excitation is an electron beam instead of X-rays. Although this represents a physically different situation, we believe that surface termination and doping also play a substantial role in the case of X-rays since these can improve surface conductivity and lower potential barrier for the escaping photoelectrons, thus improving the quantum yield. In particular, optimization of surface properties and moderate doping (with ppm concentration) is a good recipe to improve the performance of the X-ray monitor without disturbing bulk properties critical for diffracting and refractive X-ray elements.

Table I: Electron gain factor and quantum yield for a few X-ray optical materials are known in the art: in absence of total external reflection with $\theta=\pi/2$ and in the case of total external reflection at $\theta=2.5$ mrad (TER). Experimental values for quantum yield are at the primary photon energy $E_0$ and extrapolated values to $E_x=10$ keV (using linear energy dependence of $G_e$). Estimates of maximum electric current I with incident photon flux $F=10^8$ photons/s and $F=10^{16}$ photons/s are given in separate columns.

TABLE I

Electron gain factor and quantum yield for a few X-ray optical materials are known in the art: in absence of total external reflection with $\theta = \pi/2$ and in the case of total external reflection at $\theta = 2.5$ mrad (TER). Experimental values for quantum yield are at the primary photon energy $E_0$ and extrapolated values to $E_X = 10$ keV (using linear energy dependence of $G_e$). Estimates of maximum electric current I with incident photon flux $F = 10^8$ photons/s and $F = 10^{16}$ photons/s are given in separate columns.

| material | $G^e$ ($E_0$) | ($E_0$) (keV) | $G^e$ 10 keV | $Q(\theta)$ 10 keV | $I(10^8)$ pA | $I(10^{16})$ uA |
|---|---|---|---|---|---|---|
| C | 4.3 | 1 | 43 | 1.4e−4 | 0.0023 | 0.23 |
| Si | 3.8 | 0.16 | 236 | 1.0e−2 | 0.16 | 16 |
| Au (TER) | 4.3 | 1.5 | 29 | 0.6 | 9.12 | 912 |

Experimental values from the known art are given in Table 1. A few other materials studied were Al, Cu, solid Xe and those that provide increased levels for secondary electron emission (e.g., photocathodes such as CsI and CuI). No compilation of data for different materials was found. Most reported data are for soft X-rays. Thus, total electron yield due to X-ray photoemission remains largely unexplored, especially for hard X-rays.

Nevertheless, we believe that the presented key cases give a good general idea about other materials commonly used in X-ray optics. Si and C (diamond) represent majority of cases in diffractive optics. Quantum yield of other diffracting crystals such as Ge, $Al_2O_3$ (sapphire), SiC and $SiO_2$ (quartz) should be on the same order of magnitude as that of Si.

The main materials for refractive optics are Be and polymers such as SU-8. Here, due to reduction in X-ray photoionization cross section (low-Z materials), the total yield should be reduced as compared to C (diamond). However, extensive research is now being conducted on microfabricated Si and C (diamond) as a next-generation refractive optics.

Finally, for elementary metals such as Pt, Pd, Rh, W and Mo used in X-ray mirrors, the TER quantum yield should be as high as that of Au (no strong dependence on the photoionization cross-section and only slight variation in the penetration depth). Other mirror materials are again $SiO_2$ (silica) and SiC.

Example IV

An experiment was performed at the MRCAT 10BM bending magnet beamline of the Argonne Advanced Photon Source using synchrotron white X-ray beam. Various materials with attached electrodes were exposed to the white beam: a type IIa HPHT diamond crystal, a high resistivity silicon crystal (X-ray optics grade) and a graphene monolayer deposited on $SiO_2$/Si substrate (Sigma Aldrich).

To investigate influence of the electrode configuration on the total election yield three different schemes of electric circuits were implemented as shown in FIG. 3(a)-3(c).

Example V

In a continuation of Example IV, flux dependent response was simulated by increasing horizontal size of the incident X-ray beam up to 1×2 mm² (vertical×horizontal) using white-beam slits. A linear dependence of the resulting flux on the slit size was assumed which is a reasonable assumption considering that the maximum size of the slits was not too large. The flux was estimated using formulas for synchrotron radiation of a bending magnet line.

Figure 4A:
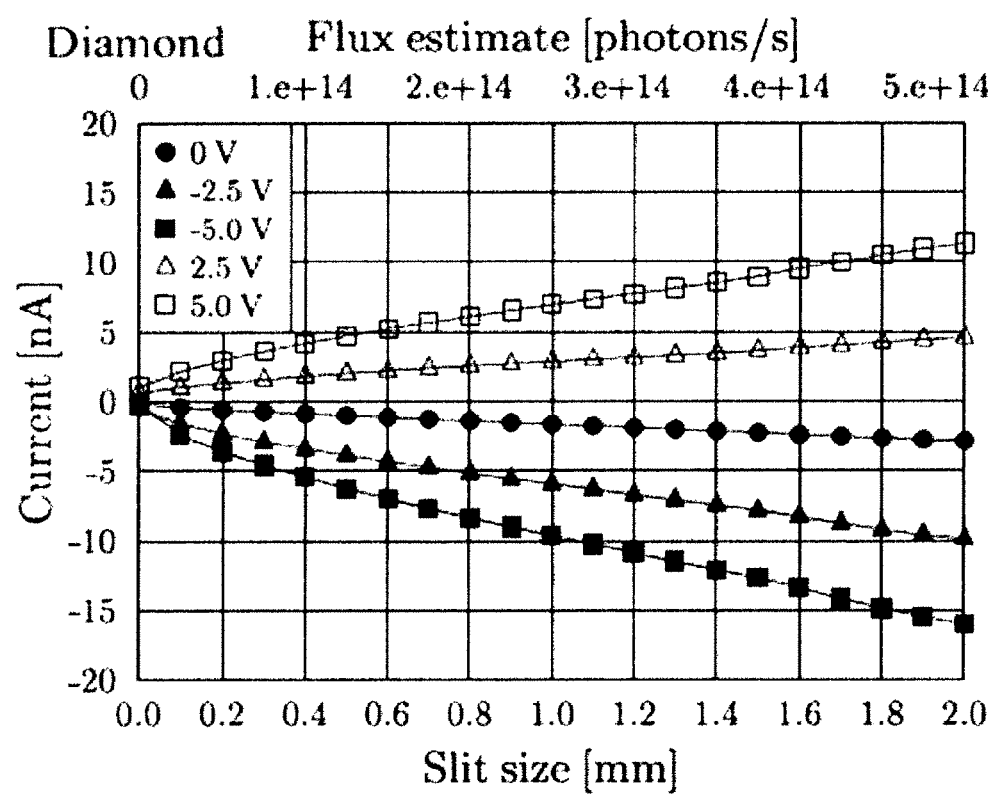
FIGS. 4(a)-4(c) show flux dependent response for different materials at different values of bias voltage based on scheme 1.
Figure 4B:
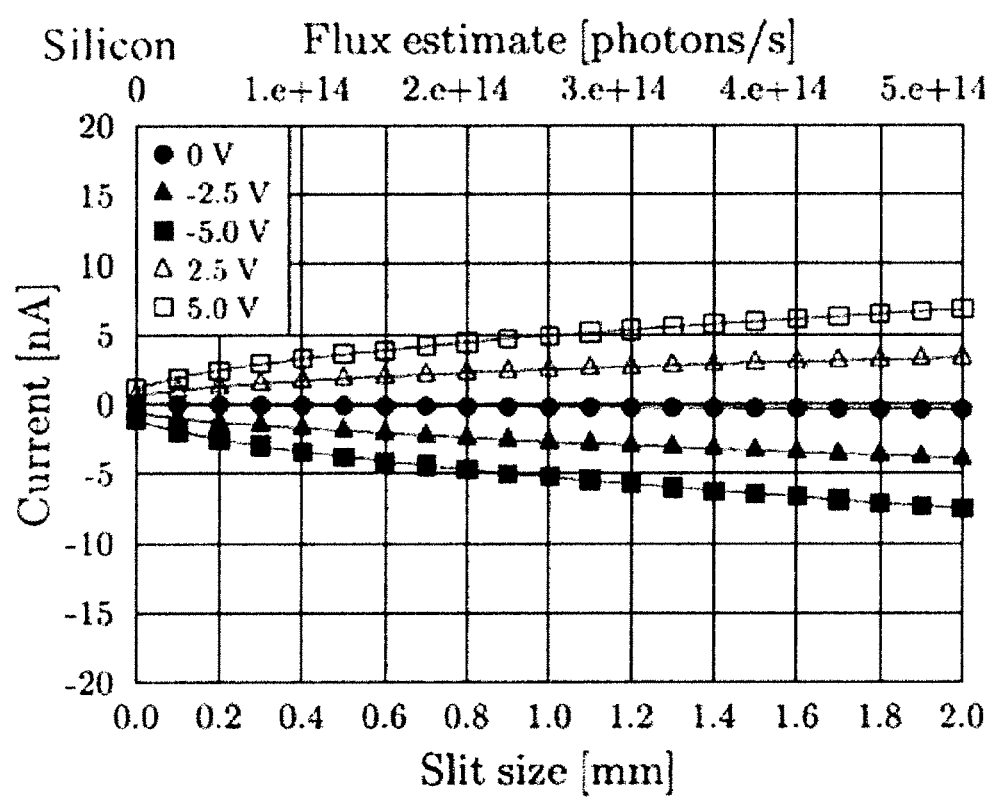
Figure 4C:
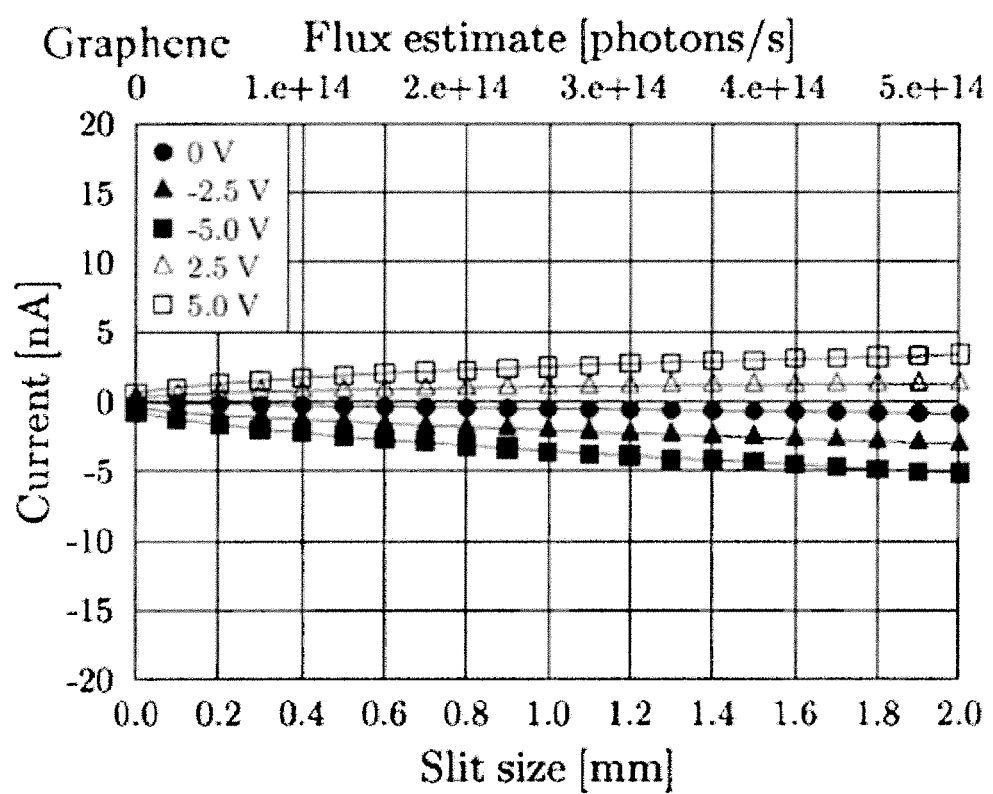

FIGS. 4(a)-4(c) (Schemes 1-3) shows how electric current in scheme 1 for various materials (diamond, silicon, graphene) depends on the incident flux. Each of FIGS. 4(a)-4(c) shows several curves corresponding to different levels of bias voltage. The largest absolute response was found for the diamond prototype. Within the framework of the theory and the extrapolated data (Example III) this indicates that the electron gain factor of diamond can be larger by orders of magnitude.

Example VI

Figure 5A:
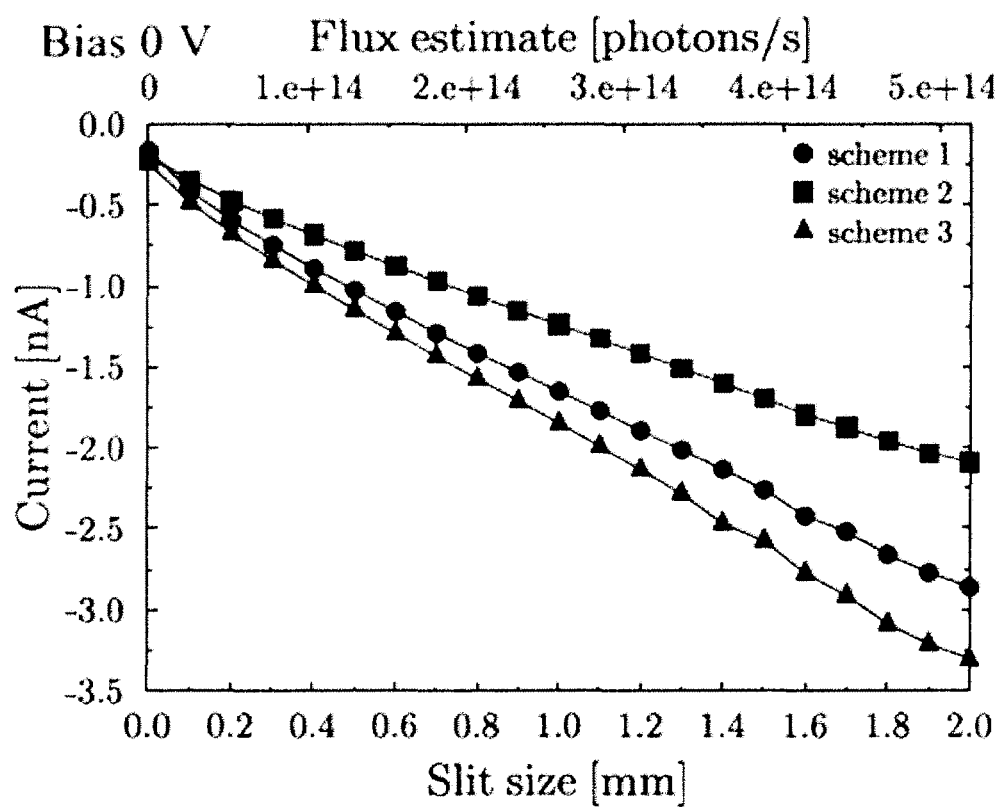
FIGS. 5(a)-5(c) show flux dependent responses for diamond in various electrical circuit configurations.
Figure 5B:
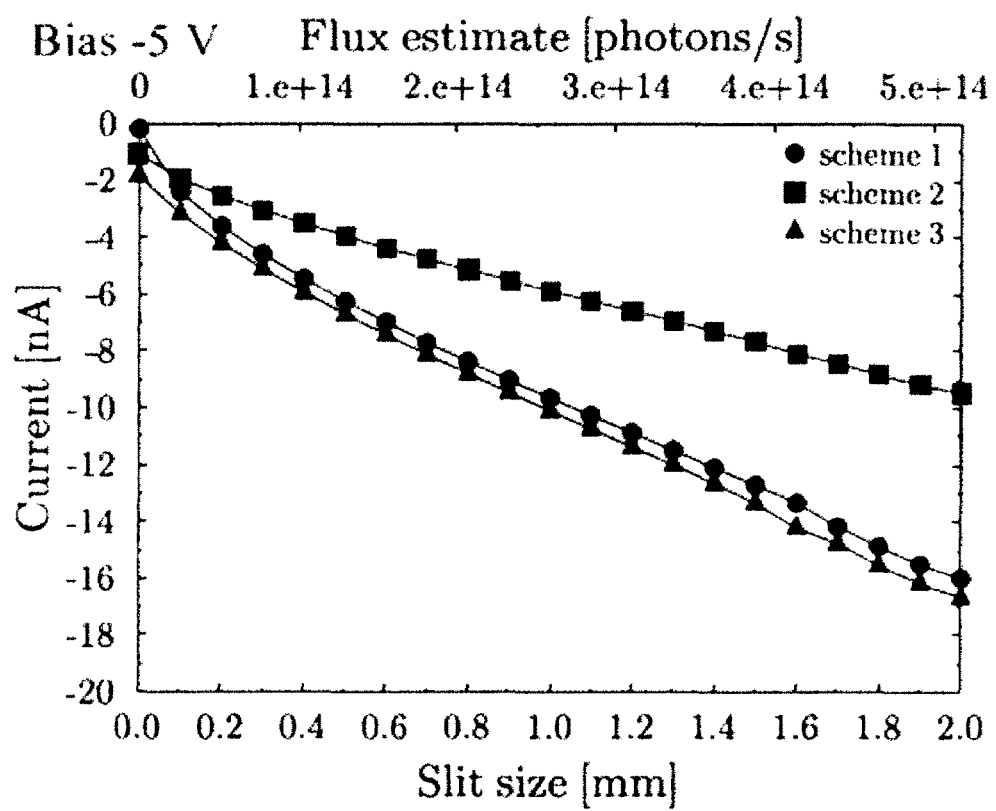
Figure 5C:
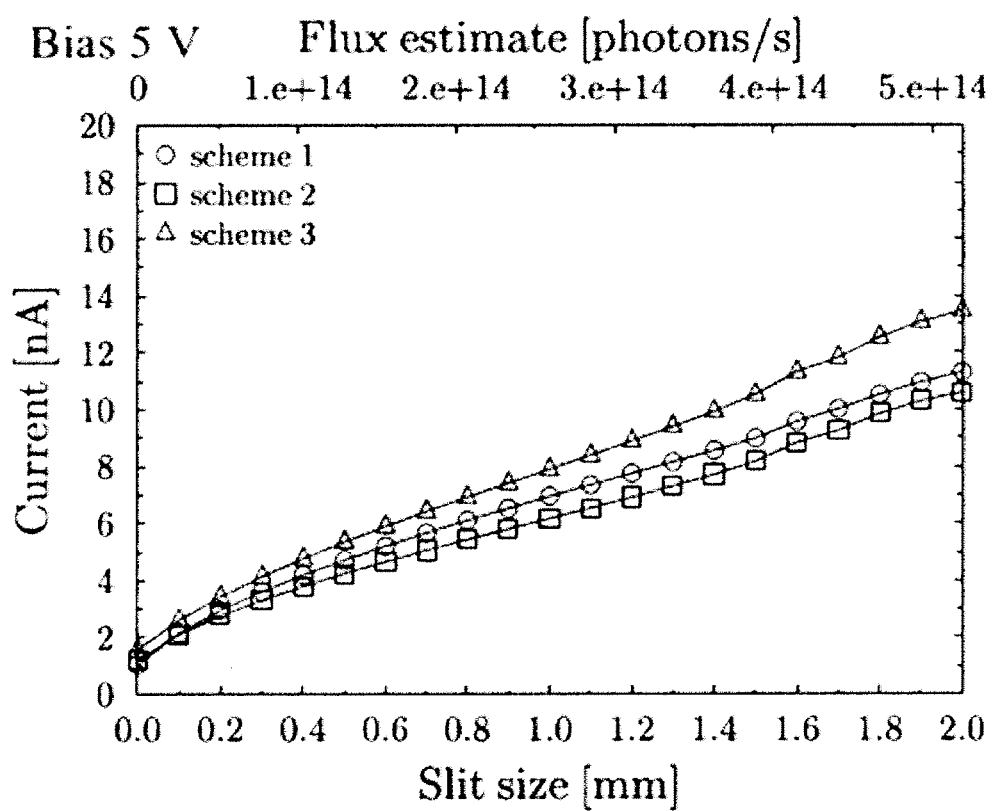

In a further evaluation, the flux dependent response of diamond was measured in the different schemes. The resulting dependencies are shown in FIG. 5(a)-5(c), where each subfigure corresponds to a different value of bias voltage The case of zero bias voltage represents the basic effect of total electron yield. The electric current increases upon application of either negative or positive bias voltage. This shall be referred to as bias-enhanced total electron yield. The application of negative bias voltage lowers the potential of the optical surface, which promotes escape of photoelectrons. This explains the increased current values at a given flux compared to the case of positive potential.

The response in scheme 3 is not much different than that of scheme 1, although a small enhancement is observed. This small enhancement may be due to the contribution of the bulk current through the diamond optical element. The response in scheme 2 is noticeably smaller, especially for negative bias. This can be explained by the absence of charge compensation due to the absence of the ground connection.

Figure 6:
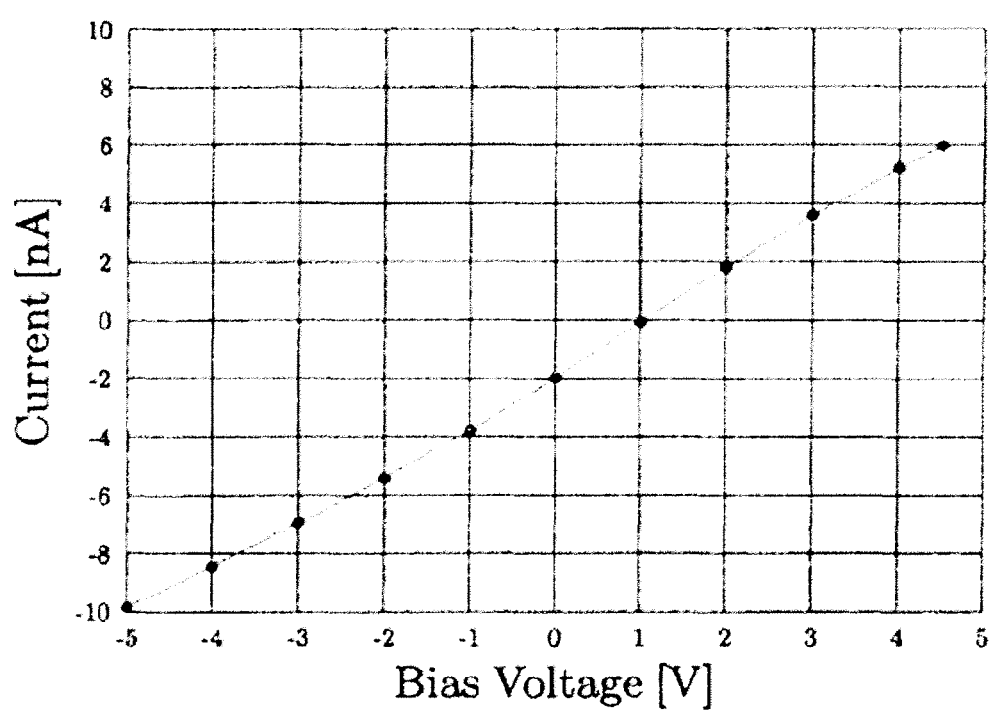
FIG. 6 shows IV characteristic of diamond based on scheme 1; the incident beam has 1×1 mm² (incident flux≈2.5×10¹⁴ photons/s)

Scheme 1 which corresponds to the measurement of total electron yield (surface effect) will be primarily considered further for clarity. The largest absolute response was obtained for the most negative bias (−5 V). The I-V curve of diamond exposed to X-rays in scheme 1 is shown in FIG. 6. The I-V curve is of an ohmic type superimposed onto the effect of charge compensation (an offset of about 2 nA from the origin). X-rays interacting with the optical element generate charge carriers and the material becomes conductive. At the same time there is an uncompensated charge at the surface, such that if the bias voltage is zero there is an electric current in the circuit. For the case represented by FIG. 6, a positive bias voltage of 1 V creates an electric current that compensates the photoemission current and the resulting observed current is zero.

Example VII

Figure 7A:
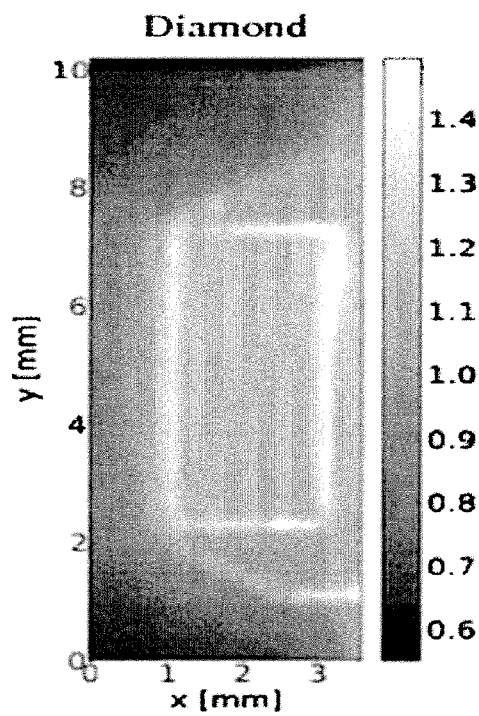
FIG. 7(a)-7(c) shows maps of bias-enhanced total electron yield for diamond, silicon and graphene, respectively.
Figure 7B:
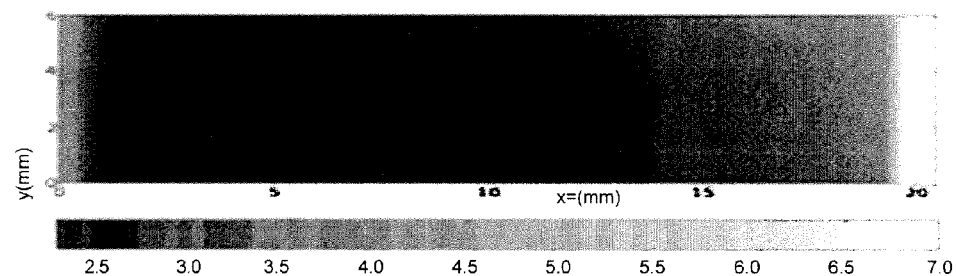
Figure 7C:
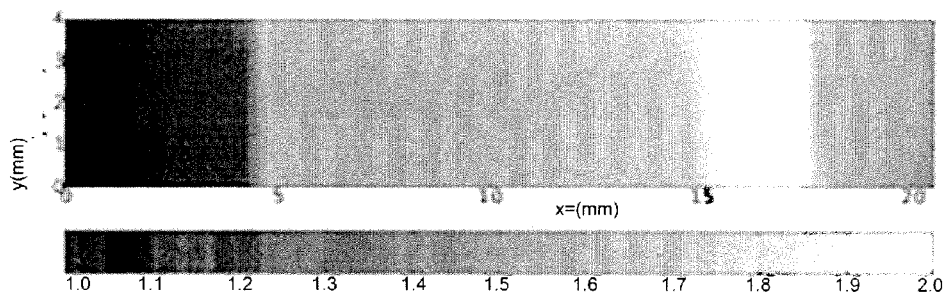

In order to map total electron yield a beam of limited cross section was used in this example analysis. For diamond the beam size was 0.2×0.2 mm². For silicon and graphene the size of the beam was 0.5×0.5 mm². The electric current was measured in the configuration of scheme 1 with an applied bias voltage of −5 V (i.e., bias-enhanced electron yield). As shown in the FIGS. 7(a)-7(c) maps in grayscale the electric current increases when the edges of the optical element are exposed to the X-ray beam (diamond and silicon). A possible explanation is that the beam is in the grazing incidence to the edge surface and grazing incidence increases the fraction of the exposed surface thus increasing photoemission. In the case of diamond the increase is also observed on the edges of the X-ray window in the diamond substrate behind the diamond crystal. This could be due to a presence of a charge transfer between the diamond crystal and the substrate. In the case of graphene the hot spot on the map corresponds to location of the electrode. The electrode is a dried silver paste. A possible explanation is that the photoabsorption in the electrode material is greater compared to graphene and the $SiO_2$/Si substrate. One of applications for the observed effect could be imaging of internal cavities in an object.

The electric current mapped on the optical surface of the materials is fairly uniform, i.e. not affected by the presence of defects in the bulk of the material. A uniform response over a working area is a desirable property for any detector. This property facilitates diagnostic and alignment of X-ray optical components as well as applications in X-ray beam position monitoring.

Example VIII

Figure 8:
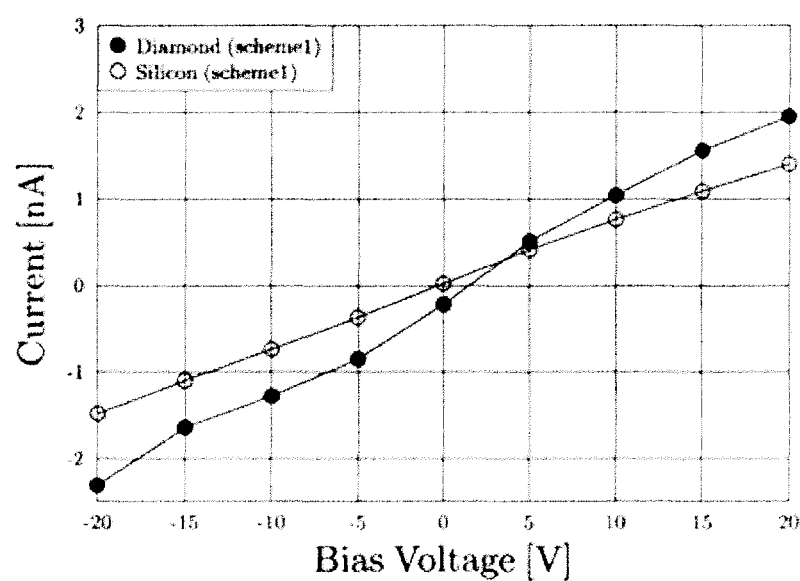
FIG. 8 shows IV curves for diamond (scheme 1) and, silicon (scheme 1) measured using an X-ray tube as a source (Cu $K_\alpha$).

In order to demonstrate wide-range of applicability of X-ray monitoring optical elements, measurements of IV curves for diamond and silicon were performed using an X-ray tube as a source. The primary energy generated by the X-ray tube was that of Cu $K_\alpha$ characteristic lines 8 keV). The total photon flux generated by the tube was $5 \times 10^{10}$ photons/s (measured using a calibrated solid state detector) over an aperture of about 20×20 $mm^2$. IV curves for diamond and silicon were measured in scheme 1 (see FIG. 8).

For diamond a measurable electric current ($\approx$0.2 nA) was observed even with a zero bias voltage, which confirms the practical utility of total electron yield for conventional X-ray sources of hard X-rays. The application of bias voltage reveals similar ohmic behavior of the IV curves for diamond and silicon in scheme 1.

Two additional columns in Table I represent maximum possible current that completely compensates the developed electric charge:

$$I = q^e F Q, \quad (10)$$

where $q^e \simeq 1.6 \times 10^{-19}$ is the electron charge and $F = f_0 S_0$ is the photon flux. One of these columns correspond to a moderate photon flux from a conventional laboratory source of X-rays (i.e., X-ray tube) $F \simeq 10^8$ photons/s. The other column corresponds to a photon flux $F \simeq 10^{16}$ photons/s of an undulator beamline of a modern synchrotron through an aperture of 1×1 $mm^2$. These two extreme cases can be considered as a full dynamic range for operation of an X-ray optical element with monitoring capabilities. Detection of small electric currents is feasible down to sub-pA regime (although detection of electric current in the pA-region may require specialized low-noise electronics). Therefore, X-ray monitoring optical elements are feasible even for X-ray setups that utilize conventional X-ray tubes and medical linear accelerators such as those used in medical diagnostics and radiation therapy. The other end of the range with currents in the mA regime represent synchrotron front-end optical components. Here, we expect that optical components with monitoring capabilities can be manufactured by deposition of electrodes on the entrance surface. Such deposition procedure should be strain-free to avoid deterioration of the optical performance. The observed electric current in the diamond assembly was reproducible at a photon flux of $\approx 10^{15}$. No visible signs of contact deterioration were observed.

Example IX

In selected embodiments of the invention, medical systems can benefit from the X-ray monitoring optical element 10 for equipment diagnostics purposes including those during which a patient is exposed to the X-ray beam 45 and the resulting current processed using the output from the ammeter 70. The utility of the X-ray monitoring optical element 10 is related to the added possibility to monitor the incident flux of the X-ray beam 45 that depends on the position of the X-ray optical element 10 in the X-ray beam 45 as described hereinafter.

The X-ray monitoring optical element 10 can in a preferred medical application embodiment be a multileaf collimator (MLC) which is a device that consists of individual segments (leaves) of high atomic number material (e.g., tungsten) that can move independently in the X-ray beam to block portions of the beam, thus shaping the X-ray beam 45 cross section. The resulting X-ray beam 45 is delivered to the patient for radiation therapy of a particular target area having the shape of the formed cross section. Typically, prior to radiation treatment of a patient the MLC form of the X-ray optical element 10 is aligned in the X-ray beam 45 and a radiation dose delivered by the shaped beam is measured. However, during the radiation treatment of a patient (which can last as long as 20 minutes), means of verification of the beam intensity and position of the leaves in the X-ray beam 45 are limited. Such verification may require a separate detector (e.g., an ionization chamber) placed after the collimator upstream the patient's body. An alternative solution to this problem is the use of an X-ray monitoring optical element 10 as the MLC where the X-ray beam 45 induced electric current will serve as an indicator for stability of the delivered beam and/or position of the leaves during radiation treatment.

Example X

In yet another embodiment the X-ray optical element 10 can be a diffraction enhanced imaging (DEI) component which is an emergent medical/biological imaging method where collimated/monochromatized X-rays are utilized. Among the main advantages of DEI over conventional radiography imaging is the ability to resolve small changes in the refraction index, making it very suitable for diagnostics of soft tissue (e.g., mammography); and a reduced radiation dose is delivered to the patient. An essential part of a DEI setup is an X-ray monochromator, which is used to collimate and/or monochromatize the primary X-ray beam 45 generated by an X-ray tube or a synchrotron source. A DEI setup can benefit from a form of the X-ray optical element 10, such as an X-ray monitoring monochromator (a single crystal or a multilayer), where a position of the monochromator crystals in the incident X-ray beam 45 is monitored by recording the X-ray induced electric current during the medical diagnostics procedure (patient in the beam) and/or during equipment diagnostics procedure (e.g. monochromator alignment).

In summary, having an optical element with X-ray beam monitoring capability is feasible for a wide variety of applications. In synchrotron and XFEL science it is particularly important for beamline diagnostics and optical alignment where a separate X-ray monitor is unavailable. A typical example is an ultra-high vacuum environment of high-heat-load front-end X-ray optics at synchrotrons and X-ray free-electron lasers. Due to harsh radiation conditions in this environment, a non-invasive monitoring of X-ray intensity is a non-trivial problem requiring a substantial improvement over prior methods and system.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. An X-ray article for processing a hard X-ray beam to measure features of the X-ray beam after interaction with a test system comprising,
    an X-ray optical element comprising a single crystal x-ray diffracting crystal operative to receive a hard X-ray beam at an exposure surface of the X-ray optical element and process the hard X-ray beam which has interacted with the test system for analysis thereof;
    the exposure surface configured to emit electrons;
    a surface electrode electrically connected with the exposure surface and an electron supply configured to provide electrons to replace the emitted electrons, creating a current, the surface electrode positioned adjacent to the exposure surface so as not to receive the hard X-ray beam;
    an amp meter positioned in electrical contact between the surface electrode and the electron supply for measuring the current; and
    the X-ray optical element further including intrinsic optical states which can be excited by the hard X-ray beam, thereby producing emission of photoelectrons and enhancement of surface;
    wherein the X-ray article includes a substrate and a second electrode electrically coupled to the substrate and to the surface electrode;
    wherein the measured current is proportional to X-ray flux of the hard X-ray beam incident on the exposure surface.

2. The X-ray article as defined in claim 1 wherein the X-ray optical element is selected from the group of single crystals for X-ray optics including diamond, Si, Ge, Be, $Al_2O_3$, SiC and $SiO_2$.

3. The X-ray article as defined in claim 1 wherein the hard x-ray beam and x-ray optical element exhibit Bragg diffraction.

4. The X-ray article as defined in claim 1 wherein the X-ray optical element is selected from the group of an X-ray refractive lens, diffractive lens, an X-ray reflective mirror, capillary optics, a collimating slit and a transmitting optical element, thereby enabling the X-ray optical element to analyze the X-ray beam which has interacted with the test system.

5. The X-ray article as defined in claim 1 wherein the X-ray article includes a substrate and another electrode coupled to the substrate.

6. The X-ray article as defined in claim 1 further including a third electrode having a positive potential and the-third electrode is disposed above the X-ray optical element to capture electrons escaping from the exposure surface, thereby accelerating the photoelectrons escaping from the X-ray optical element and preventing return of the photoelectrons to the X-ray optical element.

7. The X-ray article as defined in claim 1 further including a voltage source to lower electrical potential of a surface of the X-ray optical element and to enhance the electric current in the circuit due to a change in surface conductivity induced by the X-ray beam.

8. The X-ray article as defined in claim 6 wherein the additional electrode comprises a charged grid.

9. The X-ray article as defined in claim 1 further including an electrical circuit comprised of a first electrode and a second electrode and an ammeter coupled to ground.

10. A method of analyzing features of a test system, comprising:
    applying a hard X-ray beam to the test system;
    disposing X-ray article having a substrate and an X-ray optical element comprising a single crystal x-ray diffracting crystal operative to receive a hard X-ray beam at an exposure surface of the X-ray optical element and process the X-ray beam which has interacted with the test system for analysis thereof, the X-ray optical element including intrinsic optical states which can be excited by the hard X-ray beam, thereby producing emission of photoelectrons and enhancement of surface
    coupling a second electrode to the substrate and the surface electrode;
    emitting photoelectrons from the exposure surface of the X-ray optical element;
    capturing photoelectrons with an electrode above the surface;
    replacing emitted photoelectrons from an electron supply through a surface electrode, which is positioned adjacent to the exposure surface so as not to receive the hard X-ray beam, on the X-ray optical element causing a surface current; and
    measuring surface current, with an amp meter positioned in electrical contact between the surface electrode and the electron supply, induced by the X-ray beam striking the X-ray optical element and also collecting X-rays which have interacted with the test system and processed by the X-ray optical element, thereby accumulating information from both the induced current and the processed X-rays for analysis of features of the test system;
    wherein the measured current is proportional to X-ray flux of the hard X-ray beam incident on the exposure surface.

11. The method as defined in claim 10 further including the step of applying a bias voltage to the X-ray optical element, thereby accelerating the photoelectrons escaping from the X-ray optical element.

12. The method as defined in claim 11 wherein the bias voltage arises from an electrode being disposed adjacent the X-ray optical element.

13. The method as defined in claim 12 wherein the bias voltage electrode comprises a charged grid.

* * * * *